Patented May 18, 1943

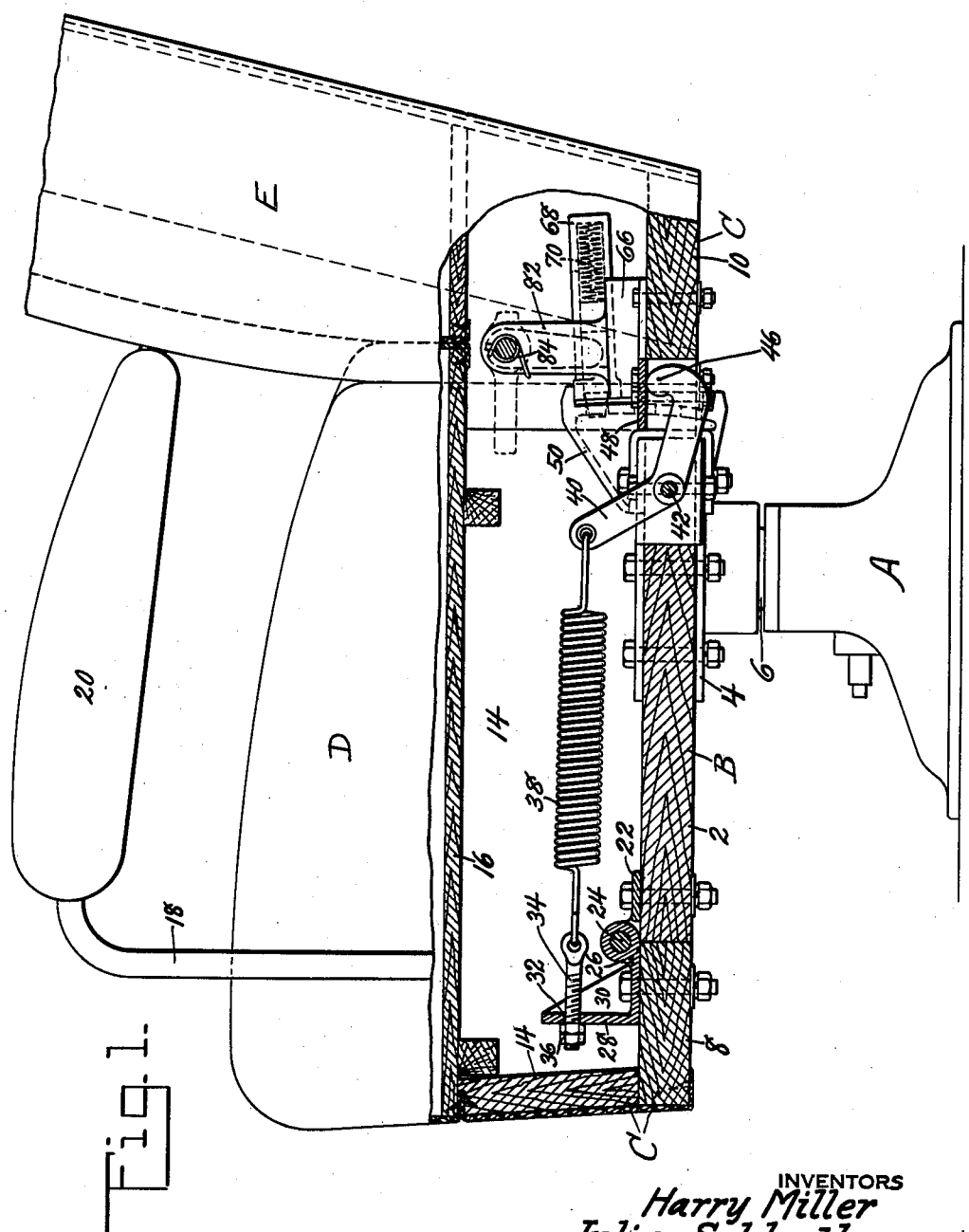

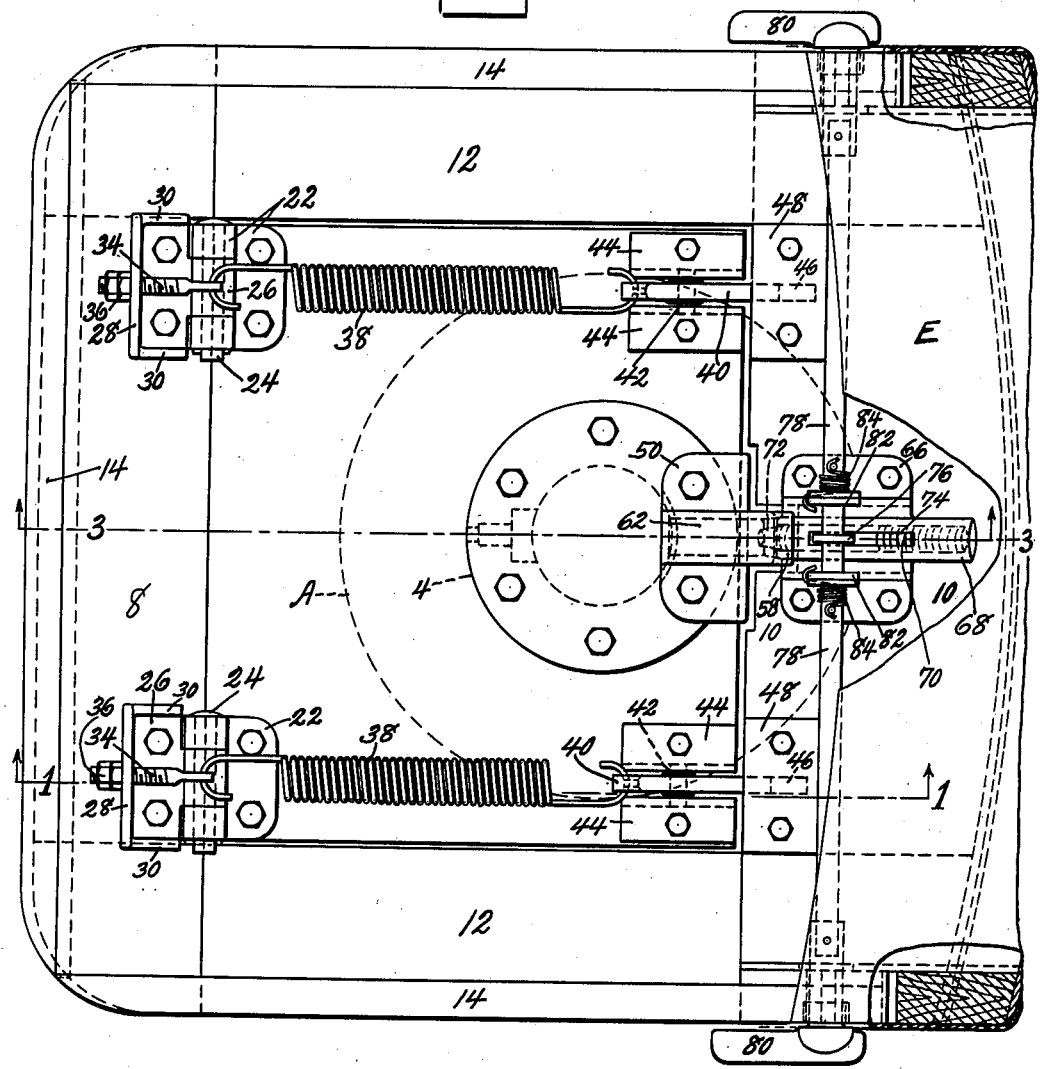

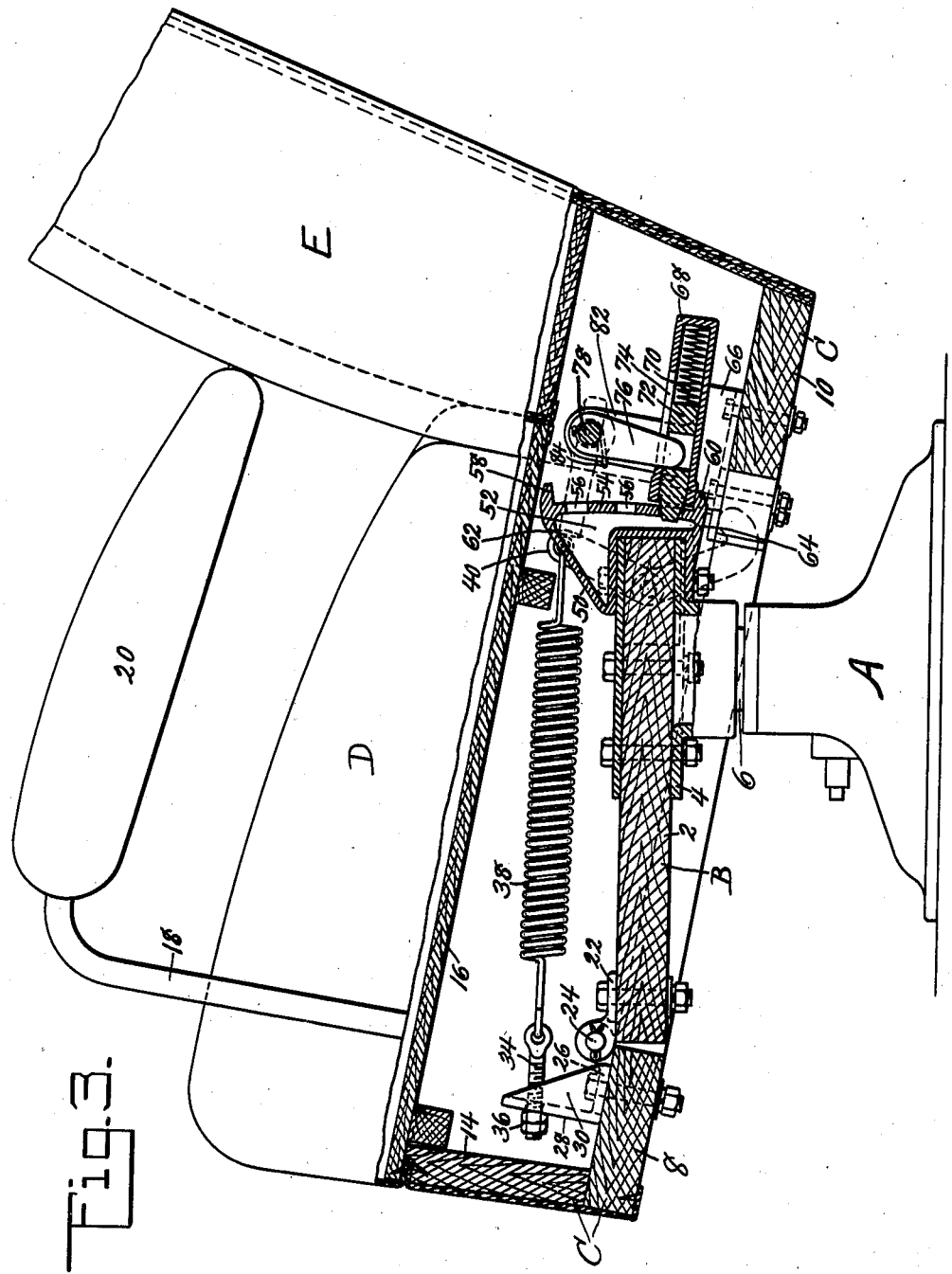

2,319,700

UNITED STATES PATENT OFFICE 2,319,700

RECLINING SEAT MECHANISM

Harry Miller and Julius Schlenther, St. Charles, Mo., assignors to American Car and Foundry Company, New York, N. Y., a corporation of New Jersey Application November 18, 1939, Serial No. 305,078

5 Claims. (Cl. 155—116)

This invention relates to reclining seats in general and in particular to such seats adapted for use on road or rail vehicles and in which the seat back and cushion base are rigid with each other.

Experiment has proven that the greatest comfort is obtained by an occupant of a seat when the seat, cushion and back are at a constant angle with respect to each other and this angle should not change when the seat back is inclined. If the angular relation between the cushion and seat back changes, then the lower portion of the occupant's spine is not properly supported by the seat and fatigue results. It is an object, therefore, of the present invention to provide a reclining seat in which the seat back and cushion remain at a constant angle relative to each other at all times irrespective of the tilted position of the seat.

A further object of the invention is the provision of a rigid seat tiltable as a unit relative to its supporting base and which is urged or counterbalanced toward its normal position.

A still further object of the invention is the provision of a rigid seat reclinable as a unit and which may be locked in any predetermined position.

These and other objects of the invention will be apparent to persons skilled in the art from a study of the following description and accompanying drawings, in which:

Figure 1 is a side elevational view of the improved seat with the lower portion in section on line 1—1 of Fig. 2 and disclosing more fully the counterbalancing arrangement;

Fig. 2 is a plan view of the improved seat but with the cushion removed and portions of the back broken away to better disclose the mechanism, and Fig. 3 is a part side view and part sectional view of the seat similar to Figure 1, but taken on line 3—3 of Fig. 2 and disclosing the right seat in fully reclined position.

Referring now to the drawings in detail, it will be seen that the entire seat assembly consists of a supporting structure or pedestal A carrying a seat base B rotatable about a substantially vertical axis and in turn pivotally carrying a seat frame C carrying the cushion D and rigid back E. The seat base B has been shown as revolvably mounted upon a pedestal, but it is, of course, obvious that such an arrangement is not necessary and that the seat base may be rigid with its support. In the present instance, however, the seat base consists of a substantially horizontal top member 2 of generally rectangular outline and which has bolted or otherwise secured thereto a trunnion plate 4 of conventional construction and having a trunnion projection 6 extending into and rotatably mounted in the pedestal or support A previously referred to.

The seat frame C is of open box-like form constructed with front and rear frame members 8 and 10 respectively, joined together by side members 12 and this skeleton frame has secured thereto risers 14 at the front and sides thereof upon which the cushion base 16 is supported. Any desired form of seat back E may be used and is rigidly connected to the rear frame member 10 and the rear edges of the side risers 14. The rigidity and permanency of the seat back position is also insured by means of arm rest frame 18 secured to the side risers adjacent their front edges and to the seat back and these arm rest frames carry any desired form of arm rest 20, upholstered in a suitable manner. In order to permit tilting of the seat frame with its attached back and supported cushion, hinge butts 22 are attached to the seat base member adjacent its forward corners and these hinge butts are connected by means of hinge pintles 24 to hinge butts 26 connected to the seat frame front member 8. As clearly shown in the figures, the hinge butts 26 are formed with an upstanding flange 28 braced by gussets 30 and these upstanding flanges are pierced as at 32 to receive an eyebolt or similar means 34. The eyebolts carry at one end adjusting nuts 36 and at the other end are connected to one end of a tension spring 38, the other end of which is connected to a lever 40. This lever is mounted upon the seat base for pivotal movement about a pivot pin 42 carried by bracket members 44 secured to the base frame adjacent the rear corners thereof. The levers work in slots cut in the seat base member and are formed with an extension projecting beyond the seat base and having a rounded end 46 adapted to engage under a metal plate 48 attached to the seat frame rear member 10 and capping a slot cut in such rear frame member; thus it will be seen that tension in the spring will act on the lever or bell-crank forcing the rounded end thereof against the plate 48 just referred to and thereby supporting or urging the seat frame toward its normal position which is substantially in alignment with the seat base. Various weights of seats are accommodated by adjustment of the tension in the spring through rotation of the nuts 36 upon the adjusting eyebolt and although the hinge butt 26 with its attached flange has been shown as secured to the seat frame front member, it will be obvious that the position of the hinge butts may be reversed, in which case the hinge butt 26 would be secured to the seat base 2, but the arrangement shown is preferred since it permits the use of a longer spring with resulting greater movement.

In order to lock the seat frame and its attached back and supported cushion in any desired reclining position, a latch plate casting 50 has been attached to the rear central portion of the seat base and this latch plate is preferably formed with upstanding ribs 52 joined together by an end wall 54, having a plurality of perforations 56 formed therein. This end wall terminates and merges into upper and lower stops 58 and 60 respectively, which also may be continuations of upper and lower walls 62 and 64 of the casting. A latch carrying casting 66 is attached to the seat frame rear member 10 at the central portion thereof and is formed with upstanding portions supporting a barrel 68, closed at one end to form a backing for compression spring 70 and open at the other end to slidably receive a latch or bolt 72 constantly urged in a direction away from the barrel by means of the compression spring just referred to. This barrel is carried in such a position as to strike against lugs 58 and 60 of the latch plate member carried by the seat base, thereby limiting positively the extent of movement possible between the seat frame and seat base. As clearly shown in Figs. 2 and 3 the latch barrel has its upper side slotted as at 74 to receive the lower end of a latch operating finger 76 projecting through the slot in the barrel and into a slot formed in the latch bolt. The upper end of the latch operating finger is rigidly connected to a transverse operating rod 78 connected at its ends to an operating handle or knob 80 journaled in the side risers of the seat frame. The central portion of the operating rod is journaled in upstanding ears 82 carried by the latch carrying casting and is preferably urged in one direction by torsion springs 84 anchored at one end on the operating rod and at the other end on the upstanding ears. These torsion springs constantly urge the latch operating finger in a direction to assist the compression spring 70 and retain the latch or sliding bolt 72 in engagement with the perforations 56 of the latch plate. Rotation of the rod 78 by means of the operating handles or knobs 80 will cause the latch operating finger to retract the sliding bolt, permitting the latch barrel and the entire seat frame assembly to shift relative to the seat base to any desired position. Release of pressure upon the operating knob will, of course, permit the torsion springs 84 and compression spring 70 to force the sliding bolt into engagement with the aligned recess 56 of the latch plate. It is, of course, obvious that instead of recesses in the latch plate a toothed segment may be utilized with the sliding bolt engaging between the teeth of the segment or that various other types of latching arrangements may be utilized.

From the preceding description it will be seen that the seat back and cushion are always retained in the same angular relationship but may be inclined relative to the base or supporting structure by release of the latch, which will permit the retention of the seat assembly in any desired reclined position. The tension springs 38 may be and are properly adjusted so as to apply sufficient force to the plates 48 to lift the entire seat frame assembly into the normal position whenever the latch is released. These springs are preferably tensioned to such a degree as to be capable of lifting more than the mere weight of the seat in order that the occupant of the seat need not arise from the seat but merely lean forward while at the same time releasing the latch in order that the seat will return to its normal position.

While the invention has been described more or less in detail, it will be obvious to persons skilled in the art that various modifications and rearrangements of parts may be made and all such modifications and rearrangements of parts are contemplated as will fall within the scope of the appended claims which define our invention.

What is claimed is:

1. A reclining seat comprising in combination, a seat base carried by a supporting pedestal structure, an inverted box-like seat frame having a cushion resting on the upper panel thereof, a seat back rigidly attached to the seat frame, pivot means supporting one side of said box-like seat frame upon the seat base for reclining movement of the seat frame and attached seat back, counterbalanced means housed within said inverted box-like seat frame and including a bell-crank secured to said seat base and bearing on said seat frame for movably supporting the other side of said seat frame on the seat base for movement relative thereto, and latch means secured in part to said seat frame and in part to said seat base to retain said frame in a plurality of predetermined positions.

2. A reclining seat comprising in combination, a seat base carried by a supporting pedestal structure, an inverted box-like seat frame having a cushion resting on the upper panel thereof, a seat back rigidly attached to the seat frame, pivot means supporting one side of said box-like seat frame upon the seat base for reclining movement of the seat frame and attached seat back, counterbalance means including a bell-crank secured to said seat base for movably supporting the other side of said seat frame on the seat base for movement relative thereto, and latch means secured to said seat frame and seat base to retain said frame in a plurality of predetermined positions, said latch means being housed within said box-like seat frame and including a sliding bolt carried by said seat frame and engageable in openings formed in a latch plate secured to said seat base and projecting into said box-like seat frame.

3. A reclining seat comprising in combination, a substantially box-shaped seat frame having a cushion receiving portion and a bottom portion formed with an opening, a seat base carried by a supporting structure and extending into said opening, said seat base and bottom portion of said seat frame being substantially in alinement when the latter is in normal position, a seat back rigidly attached to the seat frame, pivot means supporting one side of said seat frame upon the seat base for reclining movement, and means including a bell-crank secured to said base and having a portion thereof resiliently anchored to said pivot means for resiliently supporting the opposite side of said seat frame on the seat base.

4. A reclining seat comprising in combination, a substantially horizontally disposed seat base carried by a supporting pedestal structure, an inverted box-like seat frame having a rigidly attached back and a cushion receiving portion, hinge means on the front edge of said seat frame and pivotally supporting the seat frame upon the seat base for reclining movement of said seat frame and back, and a bell-crank housed within said box-like seat frame and pivotally connected to said seat base for movably supporting the rear edge of said seat frame, said bell-crank being resiliently anchored to said hinge means and constantly urging said seat frame and back toward normal position.

5. A reclining seat comprising in combination, a substantially box-shaped seat frame having a cushion receiving portion and a bottom portion formed with an opening therein, a seat base carried by a supporting structure and extending into said opening, said seat base substantially closing said opening when the seat frame is in the normal position, a seat back rigidly attached to the seat frame, pivot means supporting one side of said seat frame upon the seat base for reclining movement, and bell-crank means pivotally carried by said base within said box-shaped seat frame and resiliently connected to said pivot means for resiliently supporting the opposite side of the seat frame on the seat base.

HARRY MILLER.
JULIUS SCHLENTHER.